May 31, 1966             F. HOCK            3,254,227
APPARATUS FOR PHOTOELECTRICALLY MEASURING
THE POSITION OF A SCALE MARKER

Filed Aug. 27, 1962                     2 Sheets-Sheet 1

INVENTOR
FROMUND HOCK
BY
Toulmin & Toulmin
Attorneys

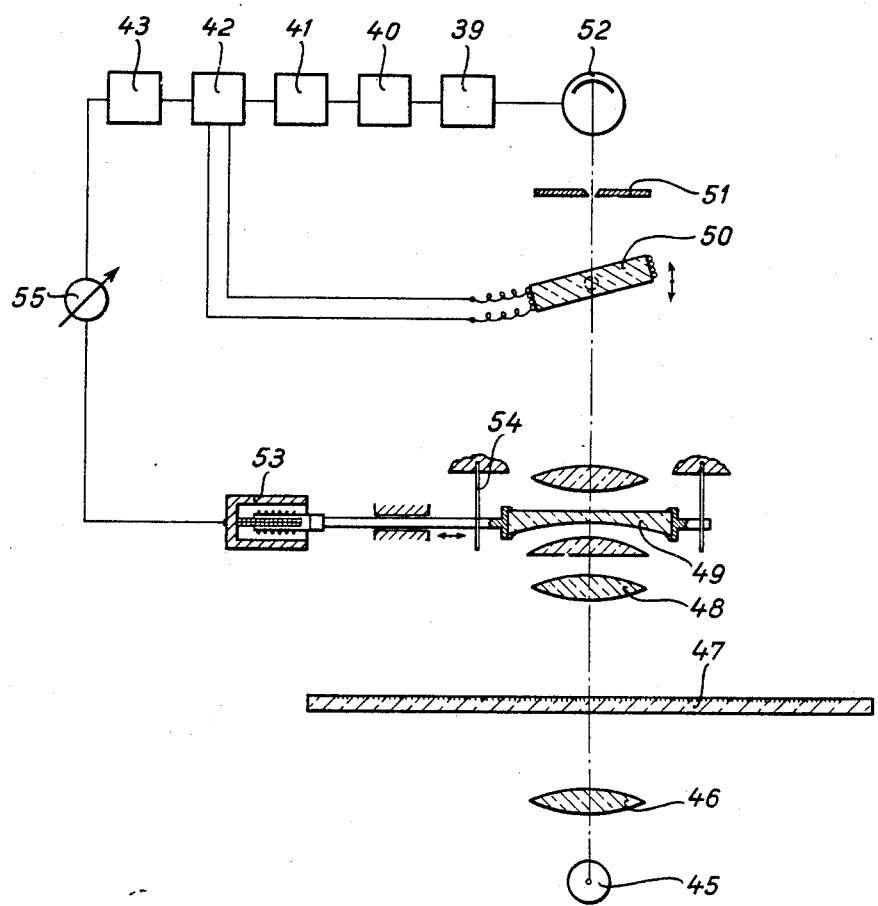

United States Patent Office 3,254,227
Patented May 31, 1966

3,254,227
APPARATUS FOR PHOTOELECTRICALLY MEASURING THE POSITION OF A SCALE MARKER
Fromund Hock, Wetzlar (Lahn), Germany, assignor to Ernst Leitz G.m.b.H., Wetzlar (Lahn), Germany
Filed Aug. 27, 1962, Ser. No. 219,417
Claims priority, application Germany, Aug. 30, 1961, L 39,904
1 Claim. (Cl. 250—235)

The present invention relates to an apparatus for photoelectrically measuring the position of a scale stroke or marker.

It is known in the art to photoelectrically scan a scale wherein the scanning system includes a periodically moving element such as a slit diaphragm, a plane parallel plate oscillating about an axis which is parallel to the surface planes of the plate, a rotary cube, or a rotating diaphragm with a spiral gap. The output signal of the photoelectric receiver is phase sensitively rectified, and the corresponding output is indicative of the exact position of the scale relative to the scanning system. Other known apparatus determine the relationship between the time the periodic scanning system responds to a scale stroke and the periodic actuation of the system.

The known systems have the disadvantage that they do not accurately register the displacement of the scale stroke from a zero position since the amplitude of the photoelectric output signal includes the existing illumination conditions, the characteristics of the amplifier employed and the amplitude of the oscillating scanner itself. In apparatus operating by comparing the time of pulse occurrences, the accuracy of measurement further depends on the uniformity of the amplitude of the oscillating scanner; this requires considerable expenditure in electrical or mechanical means ensuring constant motions.

It is therefore a primary object of the present invention to devise an apparatus which does not have the aforementioned disadvantages, and, in particular, an apparatus in which ambient light and the mechanical properties of the elements employed do not modify the accuracy of determination of the position of a scale stroke or marker.

It is a feature of the present invention to employ a deflecting or dimming optical element oscillating in the light path extending between photoelectric receiver and scale so as to modulate the light received; relative to the photoelectric receiver, the scale stroke can have a neutral position or a deflected position; if a scale stroke is in one of the latter positions, the light received will be modified. The light will also by dynamically modulated by the said oscillating optical element before entering the receiver; according to the primary feature of the invention, the output of the photoelectric receiver is fed to a feedback control element influencing the geometrical position of the said light path from the stroke so as to have the oscillation carried out about a zero position wherein the scale stroke as observed by the photoelectric receiver, i.e. its image, registers therewith. The static operation conditions of the feedback loop necessary to maintain stable conditions at a given scale position is used to indicate or record the exact scale stroke position relative a neutral position as defined by inactivated feedback loop.

While the specification concludes with the claim particularly pointing out and distinctly claiming the subject matter which is regarded as the invention, it is believed that the invention, the objects and features of the invention and further objects, features and advantages thereof will be beter understood from the following description taken in connection with the accompanying drawing in which:

FIG. 3 is a modified embodiment of the invention also illustrated in schematic view.

Figure 1:
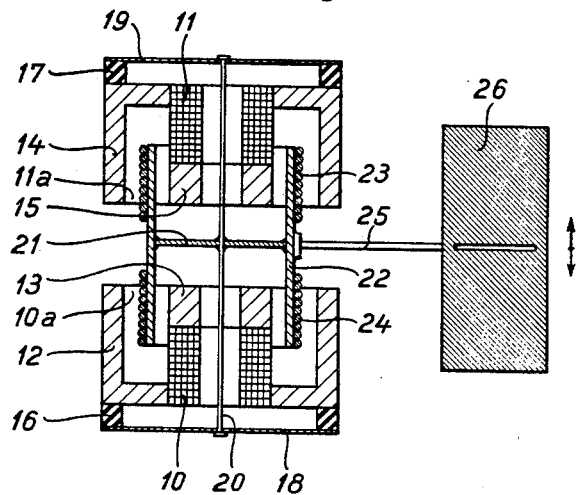
FIG. 1 illustrates a cross-section through a scanning system which can be employed in an apparatus according to the invention.
Figure 2:
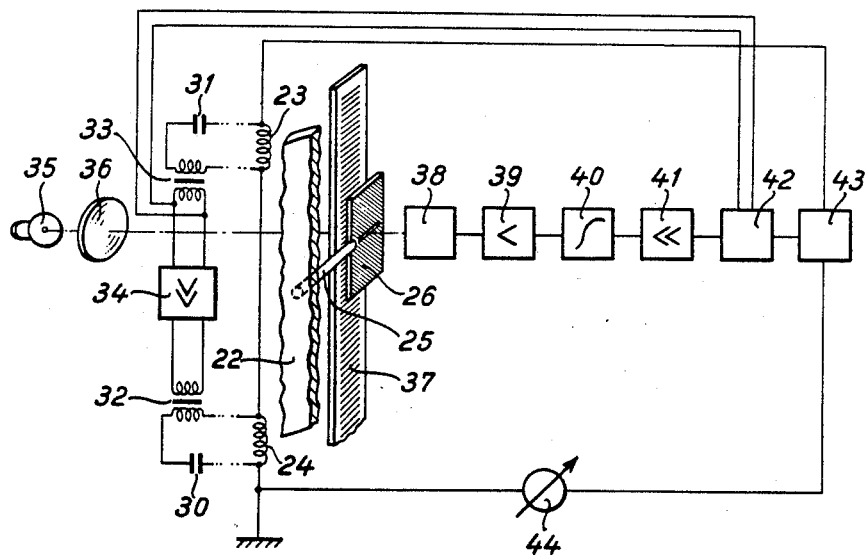
FIG. 2 is a schematic diagram of a photoelectric scanner with feedback loop and electromechanical oscillator according to the invention.

Turning first to FIG. 1 wherein is shown an oscillating scanning system to be used in connection with the arrangement shown in FIG. 2, there are first two magnet systems having ring shaped air gaps 10a and 11a and facing each other. Numerals 10 and 11 denote two ring-shaped or tubular-shaped permanent magnets respectively cooperating with pot or tank shaped soft iron shoes 12 and 14, while ring shaped pole shoes 13 and 15 are respectively coaxially arranged on magnets 10 and 11. The respective outer bottoms of elements 12 and 14 are provided with spacer rings 16 and 17 supporting membranes 18 and 19, respectively. These membranes are interconnected by a rod 20 supporting a disc 21 which in turn carries a tube 22 extending into the two air gaps 10a and 11a of the two magnet systems as defined above.

Tube 22 supports two coils 23, 24, respectively extending into ring gaps 11a and 10a and inductively coupled with magnets 11 and 10, respectively. A diaphragm 26 having a horizontal slit is secured to tube 22 by means of a bar 25. The slit causes the light from the scale to take the form of a beam that falls on the receiver. Normally, with no electric current flowing through coils 23 and 24, elements 20 and 26 and particularly the diaphragm slit will have what shall in the following be called the neutral position.

It will be observed that elements 20 to 26 are capable of mechanically oscillating about the neutral position in view of the elasticity of membranes 18 and 19 to which they are attached. These oscillations, of course, will be damped. In order to employ diaphragm 26 with advantage, the mechanical oscillator must be impelled; this will be explained now in connection with FIG. 2.

As it can be seen from FIG. 2, the two coils 23 and 24 are electrically interconnected with one coil terminal being grounded. Each coil, additionally, is connected in series with a capacitor, 30 and 31. The secondary winding of a transformer 33 completes the series connection of coil 23 and capacitor 31, while the primary winding of a transformer 32 completes the connection between coil 24 and capacitor 30. The capacitors serve to keep any D.C. flowing in coils 23, 24 from the transformers.

The secondary winding of transformer 32 is connected to the primary winding of transformer 33 by means of an amplifier 34. This latter connection provides for regenerative action of the mechanical oscillator as defined above by reference to elements 18 to 26. It can be seen from the drawing that the oscillations occur in the direction of extension of scale 37; this, of course, rests on the assumption, that there is no angular deflection of the light between the scale and the diaphram, if there is such deflection for reasons of design, the direction of oscillation will be modified accordingly.

Movement of coil 24 in the field of magnet 10 induces a voltage therein, which is transmitted through transformer 32, amplified by amplifier 34 and fed back as impelling pulse into coil 23. Since the slightest disturbance will cause oscillations, a self-excited circuit means is established and the oscillating means is therefore a self-excited oscillator. The oscillations will be at the natural frequency of the elements 18 to 26.

The purpose of this mechanical oscillator is to have slit diaphragm 26 vibrate in the light path originating in a light source 35 with collector lens 36. The light traverses a glass scale 37, passes through the slit of diaphragm 26 and enters a photoelectric receiver or detector 38 (diode, photomultiplier, photocell, photoelement, or the like). There is a preamplifier 39 connected to receiver 38. The scale 37 has opaque or light dispersing markers, so that upon its passage through the aforedefined light path, the light entering receiver 38 will be modulated accordingly. It is basically immaterial whether the scale body is transparent and the scale strokes are opaque or vice versa, since the receiver 38 and/or the preamplifier 39 can be adjusted to maximum output at either maximum or minimum light input. Likewise, movement of diaphragm 26 modulates the light received. Diaphragm forms an optical element or means because its sole functions are to form the light beam falling on receiver 38; to shift the light beam, and to modulate the light beam.

The output signal of receiver 38 is fed to the amplifier 39 having frequency selective characteristics tuned to the frequency of the mechanical oscillator. Amplifier 39 has a high amplification factor. The output signal of amplifier 39 is fed to a limiter 40 limiting the amplitude of its input signal. The output signal of limiter 40 is fed to a power amplifier 41 possibly but not necessarily having several amplification stages. The output terminals of amplifier 41 are connected to the signal input terminals of a phase sensitive rectifier 42 receiving its reference signal from the output side of amplifier 34.

The output signal of rectifier 42 is fed to a correspondingly connected filter 43 to remove from the D.C. output the mechanical oscillator frequency. The smooth D.C. ouptut voltage of filter 43 is fed to the two series connected coils 23 and 24 and to an indicating instrument 44. The filter output signal is of course also D.C., but can have either one of two directions due to the phase sensitivity of rectifier 42. The aforementioned components make up an electric control circuit to control shifting of the light beam falling on the photoelectric receiver 38.

The electric current flowing through coils 23 and 24 as supplied by filter 43, produces a magnetic field in each air gap 10a and 11a (FIG. 1) so that the zero position of the mechanical oscillator is modified. In other words, the membranes 18 and 19 are electromagnetically biased by interaction of magnets 10, 11 and of the magnetic fields set up by the D.C. current in coils 23 and 24; coils 23 and 24 are wound so that the forces resulting from the interaction with the magnets support each other. Accordingly, the zero position of the mechanical oscillator can be shifted away from the above defined neutral position. The zero-shift of the mechanical oscillator proceeds until the current in coils 23 and 24 is just sufficient to balance the oscillator at a new zero position.

The device as described thus far operates as follows: When the scale moves up (or down), the light modulations received by receiver 38 will effectively be blocked off by the frequency selectivity of amplifier 39 and to some extent by filter 43. The electric current prevailing during this time in coils 23 and 24 is not important.

When the scale 37 has assumed a particular resting position, a particular stroke or a particular marker will have a particular but yet unknown position relative to and light path supra as defined by lens 49, neutral position of slit diaphragm 26 and receiver 38, thus modifying (statically modulating) the light for the receiver 38 to a particular (static) value.

The oscillating slit diaphragm 26 superimposes on oscillation thereupon, with the oscillator yet still vibrating about the neutral position. It may be assumed that the scale stroke or a characteristical portion thereof may not be in the line defined by the photoelectric receiver and the slit in diaphragm 26 when passing through neutral.

This is sensed by the phase sensitive rectifier 42 since the diaphragm oscillations and the corresponding light oscillations sensed by a receiver 38 are not symmetrical relative to the scale stroke; the corresponding output current of filter 43 and in coils 23 and 24 now produces magnetic fields relative magnets 10 and 11 so as to shift the zero position of the mechanical oscillator from the neutral position and into a now zero position thereof.

When the diaphragm oscillates approximately about a position as defined by the then existing scale stroke position, a new balance is obtained. Since this is a static feedback control action, a residual error of course will be there, necessary to maintain the new balance. Strong amplification by amplifiers 39 and 41 will assure the residual error to be low. It has been found that an amplification being $10^3$ times larger than that necessary to cause maximum current in coils 23 and 24 for placing the mechanical oscillation in a terminal position at open feedback loop, the residual error is about 1%. Since the value is known, it can be considered upon calibration. The actual output of filter 43 is sensed by instrument 44 indicating the zero shift obtained by feedback control as described. This value can be used directly as fraction value indicator in between two scale strokes, provided full units are indicated when a scale stroke registers with the neutral position of the diaphragm.

If the device is to be used to registrate changes of an angular opaque scale, there can be used an autocollimation telescope with a photoelectric receiver positioned at its eyepiece. Instrument 44 then can be a recorder. It is readily susceptible that the invention can be employed in connection with many well known scale reading objectives and optical scanners.

In FIG. 2, it is shown how the mechanical oscillator itself is provided with a zero shift with respect to a geometrical path, which can also be defined by, a scale stroke in unit-indicating-position registering with the axis of lens 36—neutral position of the oscillator—photoelectric receiver (optical axis of pre-receiver objective lens). This is carried out in providing additional bias and galvanically coupling impelling and position sensing coil (23 and 24 respectively) with a D.C. biasing source (filter output—43).

In FIG. 3 it is shown how the zero shift is galvanically separated from the electro-mechanical oscillator while the oscillator itself (geometrically) retains its position, but the optical path of the light beam for diaphragm and scale is shifted. It thus can be said that within the concept of the invention, it is only important to shift the diaphragm relative to the optical path or vice versa, whereby the zero position is defined by the respectively existing optical path. Whether the latter is shifted towards a (constant) zero and neutral position of the oscillator or whether the optical path is maintained while the zero position of the oscillator is shifted out of the neutral position (FIG. 2) is immaterial.

Turning now to the detailed description of FIG. 3, elements 39 to 43 correspond to those in FIG. 2. The input terminal of amplifier 39 is connected to a simple photocell 52 placed adjacent a stationary diaphragm 51 which in turn receives light from a lamp 45 after having passed through the following elements: an objective lens 46 illuminating a scale 47, an objective 48, and a lens system 49 having an overall power of refraction of zero but shifting an optical path upon being shifted perpendicular to the optical axis of objective 48 (see double arrow).

Lens system 49 is suspended by leaf springs 54 so as to normally retain the optical axis as defined by the optical axis of objective 48. This corresponds to the neutral position as defined above. Then there is a pivotable plane parallel plate 50 having its pivot axis extending perpendicular to the plane of the drawing and crossing the optical axis of objective 48. Plate 50 merely oscillates or modulates the light while lens system 49 effects shifting thereof and the formation of the beam is effected by diaphragm 51. These three elements therefore accomplish the same results as diaphragm 26 of the FIGURE 2 modification.

The output current of filter 43 is fed to a solenoid 53 having an armature plunger secured to axis-shifting lens system 49.

The pivotable plate 50 oscillates, it is shown in a deflected position; in zero position the planes are perpendicular to the optical axis of objective 48.

The elements causing plate 50 to oscillate are omitted, but it can be assumed that they are similar to those disclosed in FIG. 1 for oscillating diaphragm 26. One simply can connect rod 25 of FIG. 1 to a stationary pivot while connection between rod 25 and tube 22 is likewise a pivotable one. The plate 50 then is mounted on the rod 25 at the first mentioned pivot and will oscillate as the rod is actuated.

Elements 30 to 34 of FIG. 2 are likewise employed in FIG. 3, but there is no corresponding connection between filter 43 and coils 23 and 24. In lieu thereof, the output of filter 43 actuates solenoid 53 shifting lens system 49 and therefore the optical axis relative to plate 50. During operation, the solenoid will shift lens 49 so that the image of a scale stroke always runs approximately through the pivot axis of plate 50 and the optical axis of diaphragm 51. The current to maintain such position of lens 49 is measured in instrument 55 and indicates the relative shift of a scale stroke from neutral position.

The invention is not limited to the embodiments described above but all changes and modifications thereof not constituting departures from the spirit and scope of the invention are intended to be covered by the following claim.

What is claimed is:

An apparatus for photelectrically measuring the position of a movable scale graduated in the direction of movement thereof comprising; a light source supplying light to said scale to illuminate said scale, a photoelectric receiver observing said scale so as to receive at least some of said light therefrom, first means between the light source and said receiver through which the light from said source passes operable to define a beam of light falling on said receiver so that movement of the scale will cause the graduation mark thereof to modify the light falling on said receiver, second means operable for periodically modulating the light falling on said receiver, first circuit means having an input side connected to receive the output from said receiver and having an output side and operable to deliver direct current to said output side, third means connected to the output side of said first circuit means and operable in response to the signal thereof to effect displacement of the beam of light falling on the receiver in the direction of extension of said scale and in an amount proportional to the strength of said signal, and fourth means connected to the output side of said circuit means and operable to measure the strength of the signal therefrom to thereby measure the amount of said displacement of said beam, mechanical oscillator means in the path of the light falling on said receiver for effecting siad modulation, coil means mechanically coupled to said oscillator means, magnet means establishing a magnetic field through the coil means, and self-exciting oscillatory circuit means connected to and including said coil means for energizing the coil means to actuate said oscillator means, said oscillator means including a diaphragm having a slit therein, and said diaphragm also forming said first means for defining a beam of light, said coil means being connected to receive the signal from said first circuit means and operable for shifting said diaphragm an amount proportional to said signal and thereby also comprising said third means to displace said beam.

References Cited by the Examiner
UNITED STATES PATENTS

| | | | |
|---|---|---|---|
| 2,393,631 | 1/1946 | Harrison et al. | 250—235 X |
| 2,924,768 | 2/1960 | Farrand et al. | 88—14 |
| 3,033,987 | 5/1962 | Hotham et al. | 250—203 |
| 3,037,156 | 5/1962 | Koulikowitch | 250—235 |
| 3,079,507 | 2/1963 | George | 250—232 X |
| 3,116,886 | 1/1964 | Kuehne | 250—231 |

RALPH G. NILSON, *Primary Examiner.*

WALTER STOLWEIN, *Examiner.*

JESSE D. WALL, *Assistant Examiner.*